(12) United States Patent
Li

(10) Patent No.: US 10,894,515 B1
(45) Date of Patent: Jan. 19, 2021

(54) HITCH CAMERA

(71) Applicant: Huachao Li, Guangzhou (CN)

(72) Inventor: Huachao Li, Guangzhou (CN)

( * ) Notice: Subject to any disclaimer, the term of this patent is extended or adjusted under 35 U.S.C. 154(b) by 0 days.

(21) Appl. No.: 16/600,785

(22) Filed: Oct. 14, 2019

(51) Int. Cl.
   *H04N 7/18* (2006.01)
   *B60R 11/04* (2006.01)
   *H04N 5/225* (2006.01)
   *B60R 1/12* (2006.01)
   *B60R 11/00* (2006.01)

(52) U.S. Cl.
   CPC ............ *B60R 11/04* (2013.01); *B60R 1/12* (2013.01); *H04N 5/2252* (2013.01); *H04N 5/2253* (2013.01); *H04N 5/2254* (2013.01); *B60R 2011/0026* (2013.01)

(58) Field of Classification Search
   CPC .......... H04N 7/18; H04N 7/183; H04N 5/225; H04N 5/2252; H04N 5/2253; H04N 5/2254; B60R 11/04; B60R 2011/0026; G03B 17/02; G03B 17/08
   USPC ................. 348/148, 143, 373, 374
   See application file for complete search history.

(56) References Cited

U.S. PATENT DOCUMENTS

| | | | |
|---|---|---|---|
| 7,477,309 B2* | 1/2009 | Cuccias | H04N 5/2254 348/342 |
| 10,104,066 B2* | 10/2018 | Zhang | H04L 63/083 |
| 10,382,725 B2* | 8/2019 | Jung | H04N 5/2253 |
| 10,484,582 B2* | 11/2019 | Chen | H04N 5/2253 |

* cited by examiner

*Primary Examiner* — Trang U Tran
(74) *Attorney, Agent, or Firm* — Che-Yang Chen; Law office of Michael Chen

(57) ABSTRACT

A hitch rearview camera may include a lens, a housing, a main board, a battery, and a bracket. The lens, the main board and the battery are disposed inside the housing, and both sides of the housing are disposed on the bracket by an adjusting mechanism at an adjustable angle, the bottom of the bracket is provided with a connecting device detachably connected to a vehicle, and the main board is electrically connected to the lens and the battery respectively, and the main board has a WiFi module. In one embodiment, the rearview camera can be connected through a mobile phone or other display that can receive WiFi signals. When not in use, the camera is retracted directly to save spaces. In addition, by setting an adjusting mechanism, the angle of lens can be adjusted after a camera is connected to a vehicle to ensure the camera is used properly.

8 Claims, 6 Drawing Sheets

HITCH CAMERA

FIELD OF THE INVENTION

The present invention relates to the field of vehicle supplies, and more particularly to a hitch rearview camera.

BACKGROUND OF THE INVENTION

With the development of automotive technology, rearview cameras have become widely used, providing great help for the use of vehicles. Currently, rearview cameras are fixedly mounted at the rear portion of vehicles, which is extremely inconvenient for some vehicles that need to be used flexibly, such as trailers, container trucks, etc. For other vehicles or container cargos, the rearview camera may be required to enter the site, but currently available hitch rearview cameras seem not to have the function of camera shooting.

SUMMARY OF THE INVENTION

In order to overcome the deficiencies of conventional rearview cameras, the present invention provides a hitch rearview camera, which can be used as needed and flexibly, and is easy to operate.

In one aspect of the present invention, a hitch rearview camera, comprising: a lens, a housing, a main board, a battery, and a bracket, wherein the lens, the main board, and the battery are disposed inside the housing, and both sides of the housing are disposed on the bracket by an adjusting mechanism at an adjustable angle, the bottom of the bracket is provided with a connecting device detachably connected to a vehicle, and the main board is electrically connected to the lens and the battery respectively, and in one embodiment, the main board is provided with a WiFi module.

In another embodiment, the hitch rearview camera may include a lamp panel disposed inside the housing and sleeved with the lens, the lamp panel is provided with a plurality of infrared lamps and photosensitive elements, and the plurality of infrared lamps are evenly distributed on both sides of the lens or annularly distributed on the outer side of the lens.

In another embodiment, a power lamp is provided on the lamp panel, and the power lamp is electrically connected to the battery.

In a further embodiment, a lamp panel fixing bracket is further provided inside the housing, and the lamp panel fixing bracket is located between the lamp panel and the housing, a first through hole is provided on the lamp panel fixing bracket corresponding to the lens, a front end of the lens is disposed in the first through hole, and a first mounting hole, a second mounting hole and a third mounting hole are provided on the lamp panel fixing bracket corresponding to the infrared lamp, the photosensitive element and the power lamp respectively.

In still a further embodiment, a glass is provided at the front end of the lens, and the glass is fixed on the housing, and a first seal ring is provided between the glass and the housing.

In still a further embodiment, a lens darkening ring and a lens base for installation of the lens are provided in the housing, the lens base is fixed on the main board, the rear end of the lens is disposed inside the lens base, and the front end of the lens is inserted inside the lens darkening ring.

In an exemplary embodiment, the adjusting mechanism comprises a screw and a side fixing plate, and a connecting hole is provided on both sides of the bracket, the side fixing plate is detachably disposed in the connecting hole, a second through hole is disposed in a middle portion of the side fixing plate, and a threaded hole is disposed at the two ends of the housing corresponding to the second through hole, and the screw is connected to the threaded hole through the second through hole.

In some embodiments, the connecting device is a magnet, and the housing is provided with a charging hole for charging the battery and a power button for turning the camera on or off.

In some embodiments, the housing comprises a front housing and a rear housing, and a second seal ring is disposed between the front housing and the rear housing.

The present invention is advantageous because by setting a connecting device when necessary, the camera is connected to the vehicle, and then the camera is connected through a mobile phone or other display that can receive WiFi signals. When not in use, the camera can be retracted directly to save spaces. In addition, with the adjusting mechanism, the angle of lens can be adjusted after a camera is connected to the vehicle to ensure the camera is properly used. The rearview camera of the present invention can be used as needed and flexibly, and is easy to operate.

DETAILED DESCRIPTION OF THE EMBODIMENTS

Figure 1:
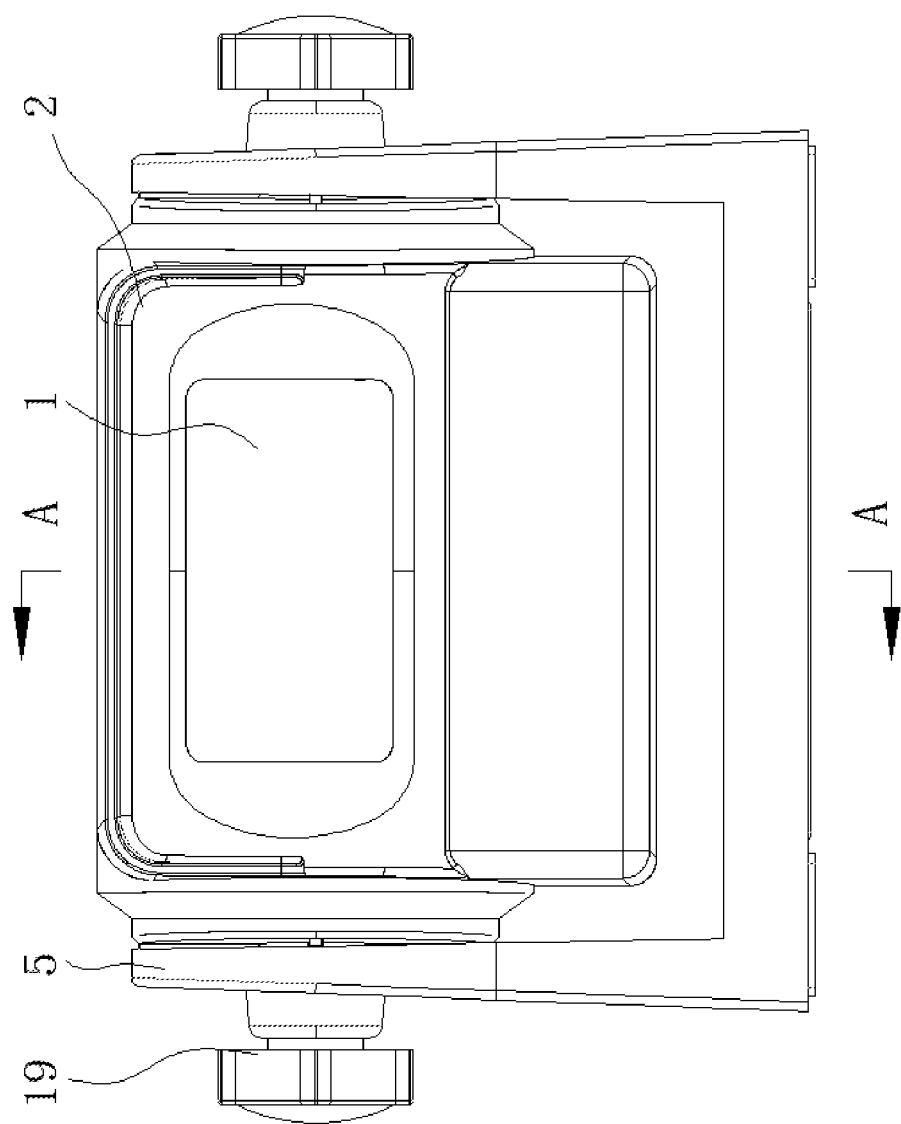
FIG. 1 is a front view of the hitch rearview camera of the present invention.
Figure 2:
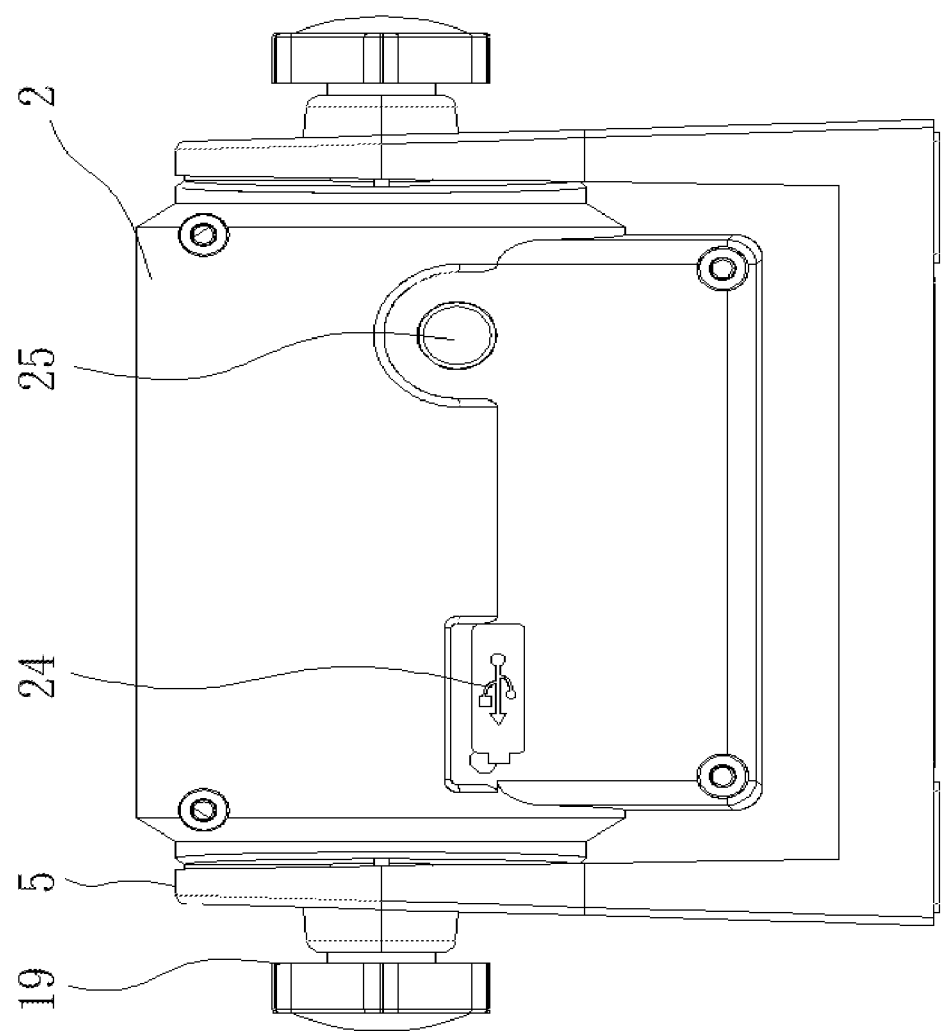
FIG. 2 is a schematic view of the A-A section of FIG. 1.
Figure 3:
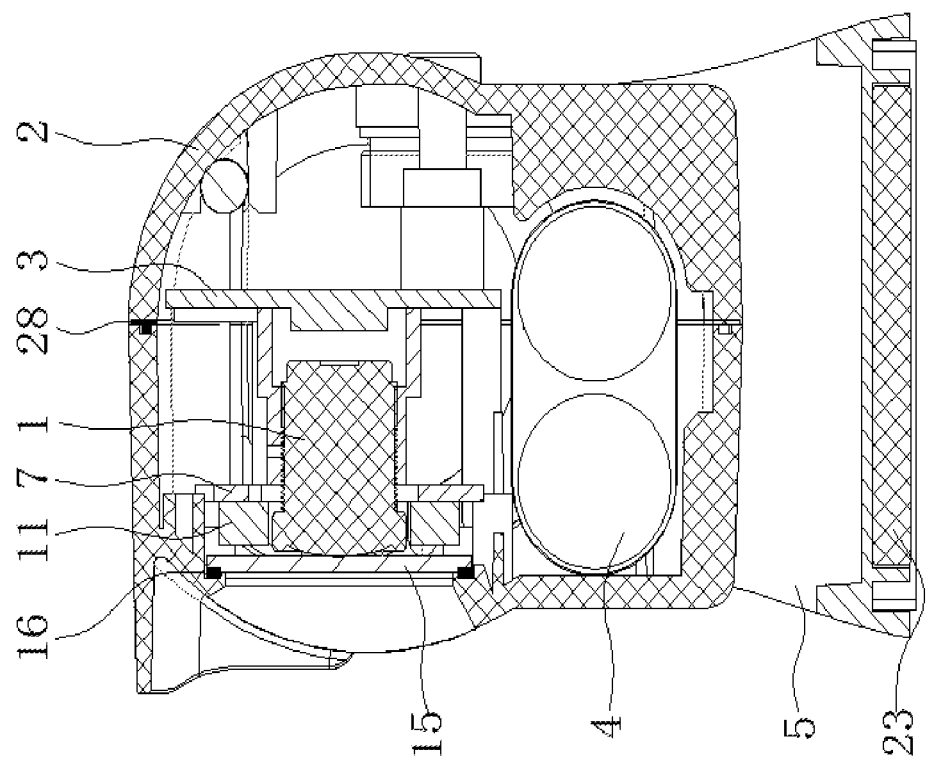
FIG. 3 is a rearview of a hitch rearview camera of the present invention.
Figure 4:
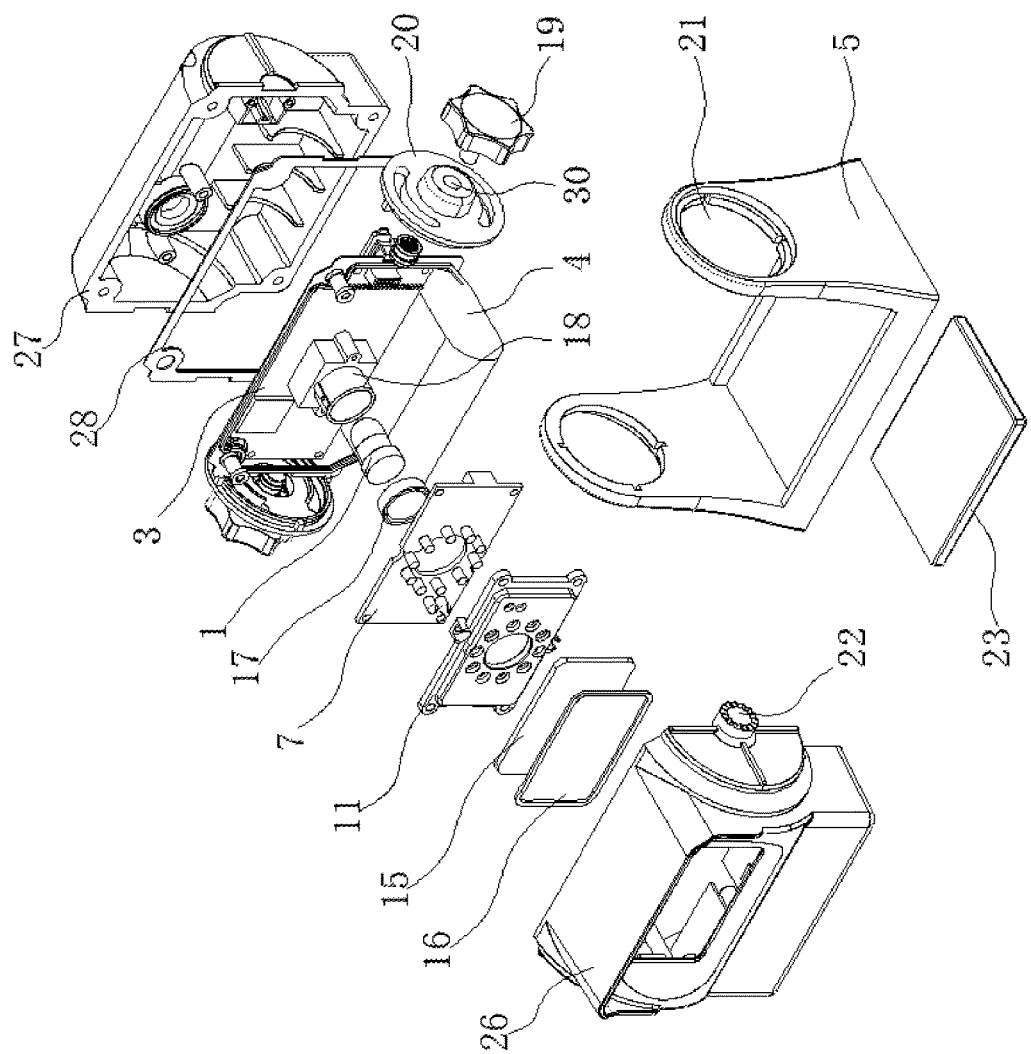
FIG. 4 is an exploded view of a hitch rearview camera of the present invention.

The specific embodiments of the present invention are further described in detail below with reference to the drawings and embodiments. The following embodiments are intended to illustrate the invention but are not intended to limit the scope of the invention. All other embodiments obtained by those skilled in the art without creative work based on the embodiments of the present invention are within the scope of protection of the present invention.

Referring to FIGS. 1 to 4, a hitch rearview camera of this embodiment includes a lens 1, a housing 2, a main board 3, a battery 4, and a bracket 5. The lens 1, the main board 3, and the battery 4 are disposed inside the housing 2, and both sides of the housing 2 are disposed on the bracket 5 by an adjusting mechanism at an adjustable angle, the bottom of the bracket 5 is provided with a connecting device detachably connected to a vehicle. Preferably, the connecting device is a magnet 23, and the magnet 23 is easily connected or disassembled with the vehicle. The main board 3 is electrically connected to the lens 1 and the battery 4 respectively, and the main board 3 is provided with a WiFi module.

For the rearview cameras based on the foregoing technical features, by setting a connecting device, when needing to use, the camera is connected to the vehicle, and then the camera is connected through a mobile phone or other display that can receive WiFi signals. When there is no need to use, the camera is retracted directly, to achieve flexible use. In addition, by setting an adjusting mechanism, the angle of lens can be adjusted after a camera is connected to a vehicle, to ensure the use effect of the camera. The hitch rearview camera of the present invention is easy to operate, with good use effect, so it is easy to achieve promotion and applications.

Figure 5:
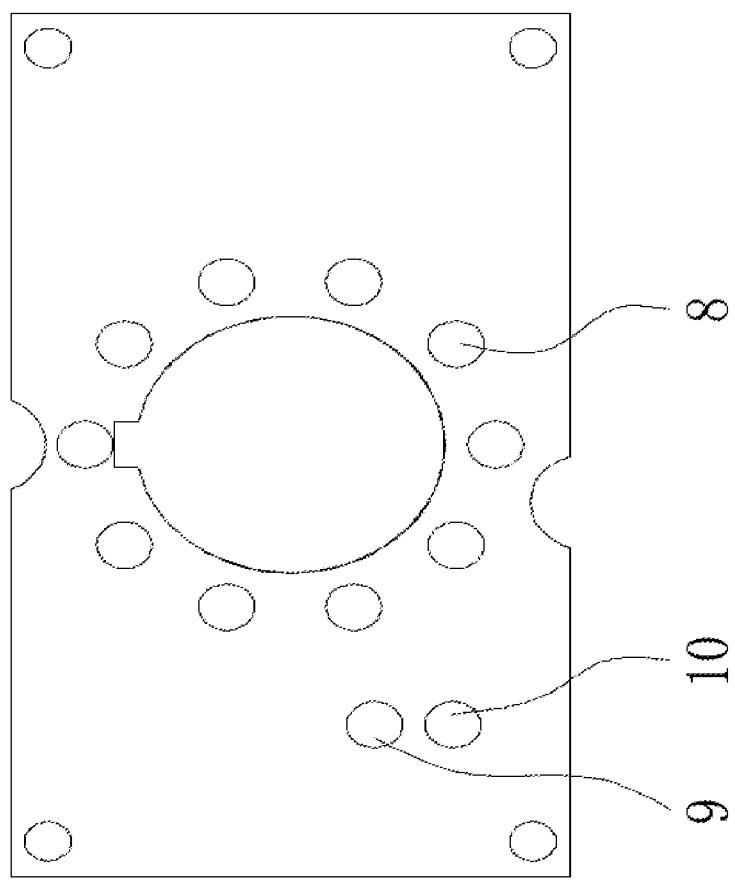
FIG. 5 is a schematic structural diagram of a lamp panel of a hitch rearview camera of the present invention.

Referring to FIG. 5, in this embodiment, the hitch rearview camera further includes a lamp panel 7 disposed inside the housing 2 and sleeved with the lens 1, and the lamp panel 7 is provided with a plurality of infrared lamps 8 and photosensitive elements 9, and the plurality of infrared lamps 8 are evenly distributed on both sides of the lens 1 or annularly distributed on the outer side of the lens 1. By setting the photosensitive element 9, the illumination condition of the external environment can be detected. When the light is dark, the photosensitive element 9 controls the infrared lamp 8 to turn on and provide the light for the lens 1, to ensure definition of shooting. At the same time, in order to facilitate the use of the hitch rearview camera, a power lamp 10 is provided on the lamp panel 7, and the power lamp 10 is electrically connected to the battery 4, and the housing 2 is provided with a power button 25. When the hitch rearview camera is installed for use, the power button 25 is pressed, and the power lamp 10 is lit, indicating that the hitch rearview camera is already on and can be used. After use, the power button 25 is pressed again, and the power lamp 10 is turned off, indicating that the hitch rearview camera has been closed, and the hitch rearview camera can be retracted.

In addition, since the lamp panel 7 is sleeved on the lens 1, the middle portion of the lamp panel 7 should be provided with a through hole through which the lens 1 passes, and for the convenience of installation of the lens 1, the diameter of the through hole should be larger than the outer diameter of the lens 1. When installation of a plurality of the infrared lamp 8, they need to be evenly distributed on both sides of the through hole or annularly distributed on the outer side of the through hole, to ensure that the plurality of infrared lamps 8 are evenly distributed on both sides of the lens 1 or annularly distributed on the outer side of the lens 1.

Figure 6:
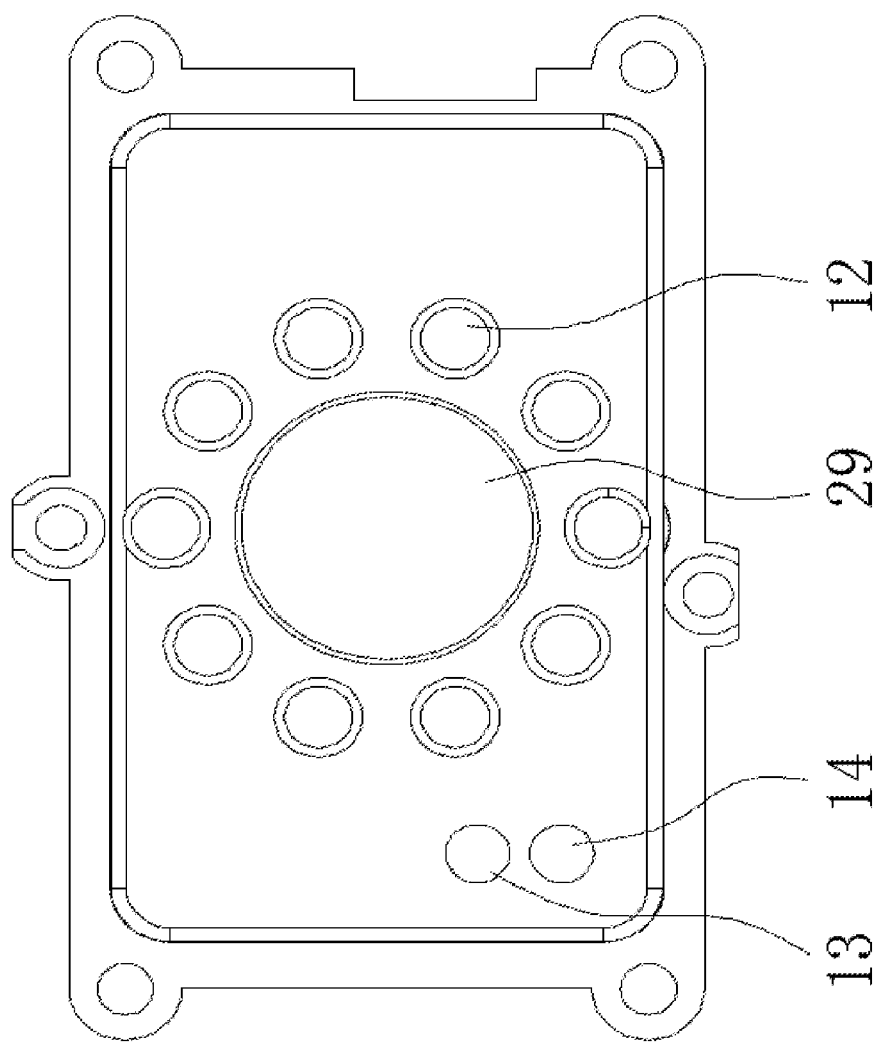
FIG. 6 is a schematic structural diagram of a lamp panel fixing bracket of a hitch rearview camera of the present invention.

Referring to FIG. 6, in this embodiment, in order to facilitate the fixing of the lamp panel 7 and the positioning and installation of various components on the lamp panel 7, a lamp panel fixing bracket 11 is further provided inside the housing 2, and the lamp panel fixing bracket 11 is located between the lamp panel 7 and the housing 2, a first through hole 29 is provided on the lamp panel fixing bracket 11 corresponding to the lens 1, a front end of the lens 1 is disposed in the first through hole 29, and a first mounting hole 12, a second mounting hole 13 and a third mounting hole 14 are provided on the lamp panel fixing bracket 11 corresponding to the infrared lamp 8, the photosensitive element 9 and the power lamp 10 respectively.

In this embodiment, a glass 15 is provided at the front end of the lens 1, and the glass 15 is fixed on the housing 2, specifically, the glass 15 is located between the lamp panel fixing bracket 11 and the housing 2. A first seal ring 16 is provided between the glass 15 and the housing 2. By setting the first seal ring 16, water vapor is prevented from entering the interior of the housing 2 from the junction of the glass 15 and the housing 2 to damage the components inside.

In this embodiment, in order to facilitate the installation of the lens 1 and ensure the shooting quality of the lens 1, a lens darkening ring 17 and a lens base 18 for installation of the lens 1 are provided in the housing 2, the lens base 18 is fixed on the main board 3, the rear end of the lens 1 is disposed inside the lens base 18, and the front end of the lens 1 is inserted inside the lens darkening ring 17.

In this embodiment, the adjusting mechanism includes a screw 19 and a side fixing plate 20, and a connecting hole 21 is provided on both sides of the bracket 5. Preferably, the bracket 5 is a U-shape bracket, and the two connecting holes 21 are respectively disposed at upper ends of the U-shaped arms of the U-shaped bracket. The side fixing plate 20 is detachably disposed in the connecting hole 21, and preferably, a groove is provided on the side wall of the connecting hole 21, and a protrusion matching the groove is provided on the outer side of the side fixing plate 21. When mounting, the protrusion is just mounted with the groove to achieve the mounting of the side fixing plate 21, which is simple and convenient to operate. A second through hole 30 is disposed in a middle portion of the side fixing plate 21, and a threaded hole 22 is disposed at the two ends of the housing 2 corresponding to the second through hole 30, and the screw 19 is connected to the threaded hole 22 through the second through hole 30. When adjusting the angle of the rearview camera, just the screw 19 on both sides of the housing 2 is rotated simultaneously. At the same time, in order to facilitate the rotation of the screw 19, the end portion of the screw 19 away from the end of the housing 2 may be provided with a rotating handle, the rotating handle is fixedly connected with the screw 19, and the rotation handle is only required to rotate when rotating the screw 19.

In this embodiment, the battery 4 is provided with a charging battery, and the housing 2 is provided with a charging hole 24 for charging the battery 4. When charging the battery 4, only the charging line is connected to the charging hole 24. At the same time, in order to prevent water or dust from the charging hole 24, a waterproof rubber plug may be provided on the housing 2 corresponding to the charging hole 24. The waterproof rubber plug is inserted into the charging hole 24 when charging is not required, and it can be pulled out when charging.

In this embodiment, the housing 2 includes a front housing 26 and a rear housing 27, and a second seal ring 28 is disposed between the front housing 26 and the rear housing 27. By disposing the housing 2 to be spliced by the front housing 26 and the rear housing 27, it is convenient to mount components and parts in the interior of the housing 2. At the same time, a second seal ring 28 is disposed between the front housing 26 and the rear housing 27 to ensure the watertightness of the interior of the housing 2 and the use environment of each component inside the housing 2, thereby avoiding damage to parts and components inside in the housing 2.

The foregoing description is only a preferred embodiment of the present invention, and it should be noted that those skilled in the art can make improvements and substitutions without departing from the technical principles of the present invention, and such improvements and substitutions should fall into the scope of protection of the present invention.

The invention claimed is:

1. A hitch rearview camera, comprising: a lens, a housing, a main board, a battery, and a bracket, wherein the lens, the main board, and the battery are disposed inside the housing, and both sides of the housing are disposed on the bracket by an adjusting mechanism at an adjustable angle, the bottom of the bracket is provided with a connecting device detachably connected to a vehicle, and the main board is electrically connected to the lens and the battery respectively, and the main board is provided with a WiFi module, wherein a lamp panel disposed inside the housing and sleeved with the lens, and the lamp panel has a plurality of infrared lamps and photosensitive elements; and the plurality of infrared lamps are evenly distributed on both sides of the lens or annularly distributed on the outer side of the lens, and the infrared lamps are controlled by the photosensitive elements to provide light for the lens, and wherein a power lamp is disposed under the photosensitive elements on the lamp panel, and the power lamp is electrically connected to the battery.

2. The hitch rearview camera according to claim 1, wherein a lamp panel fixing bracket is further provided inside the housing, and the lamp panel fixing bracket is located between the lamp panel and the housing, a first through hole is provided on the lamp panel fixing bracket corresponding to the lens, a front end of the lens is disposed in the first through hole, and a first mounting hole, a second mounting hole and a third mounting hole are provided on the lamp panel fixing bracket corresponding to the infrared lamp, the photosensitive element and the power lamp respectively.

3. The hitch rearview camera according to claim 1, wherein a glass is provided at the front end of the lens, and the glass is fixed on the housing, and a first seal ring is provided between the glass and the housing.

4. The hitch rearview camera according to claim 1, wherein a lens darkening ring and a lens base for installation of the lens are provided in the housing, the lens base is fixed on the main board, the rear end of the lens is disposed inside the lens base, and the front end of the lens is inserted inside the lens darkening ring.

5. The hitch rearview camera according to claim 1, wherein the adjusting mechanism comprises a screw and a side fixing plate, and a connecting hole is provided on both sides of the bracket, the side fixing plate is detachably disposed in the connecting hole, a second through hole is disposed in a middle portion of the side fixing plate, and a threaded hole is disposed at the two ends of the housing corresponding to the second through hole, and the screw is connected to the threaded hole through the second through hole.

6. The hitch rearview camera according to claim 1, wherein the connecting device is a magnet.

7. The hitch rearview camera according to claim 1, wherein the housing is provided with a charging hole for charging the battery and a power button for turning the camera on or off.

8. The hitch rearview camera according to claim 1, wherein the housing comprises a front housing and a rear housing, and a second seal ring is disposed between the front housing and the rear housing.

* * * * *